United States Patent [19]
Sargent

[11] 3,912,987
[45] Oct. 14, 1975

[54] VARIABLE CAPACITORS

[75] Inventor: Raymond W. Sargent, Shelburne, Vt.

[73] Assignee: Simmonds Precision Products, Inc., Tarrytown, N.Y.

[22] Filed: Oct. 25, 1973

[21] Appl. No.: 409,668

[52] U.S. Cl............................ 317/249 R; 317/250
[51] Int. Cl.²........................................ H01G 5/14
[58] Field of Search................ 317/249 R, 250, 246

[56] References Cited
UNITED STATES PATENTS

| | | | |
|---|---|---|---|
| 1,824,402 | 9/1931 | Martenot | 317/249 R |
| 3,570,003 | 3/1971 | West | 317/246 |
| 3,683,402 | 8/1972 | Parnell | 317/250 |

*Primary Examiner*—E. A. Goldberg
*Attorney, Agent, or Firm*—Edwin E. Greigg

[57] ABSTRACT

A variable capacitance transducer has a cable loop interlinked with a metallic tube. The cable loop comprises a metallic cable-half joined to an insulative cable-half. The portion of the cable loop passing through the metallic tube is axially positioned in the tube and a capacitive element is formed by the metallic tube and the metallic cable-half. Displacement of the cable loop to vary the amount of the metallic cable-half inside the metallic tube varies the capacitance of the capacitive element in a linear manner.

10 Claims, 5 Drawing Figures

FIG. 1.

VARIABLE CAPACITORS

BACKGROUND OF THE INVENTION

1. Field of the Invention

The invention relates to variable capacitors and variable capacitance transducers in which the capacitance varies with movement of one of its elements.

2. Brief Description of the Prior Art

Known in the art are variable capacitance transducers in which linear movement is sensed by a change in the distance between two capacitor electrodes. Such transducers, however, can only reliably be used to measure small displacements of the order of fractions of an inch.

Also known are variable capacitance transducers which rely on variation with movement of the area of overlap of two spaced rigid electrodes. These transducers may be of two types; in the first type, linear movement is directly used to vary the area of overlap by linear separation of the electrodes. This type is not compact and occupies in length substantially twice the maximum linear displacement to be sensed. In the second type of this transducer, linear movement is converted into a rotational one which is then used to vary the area of electrode overlap. This second type as well as suffering the size disadvantage of the first type further suffers from errors introduced by gearing arrangements.

It is an object of the invention to provide an improved variable capacitor. It is a further object of the invention to provide a compact, lightweight variable capacitance transducer capable of sensing large linear movements with a high degree of accuracy and with infinite resolution.

SUMMARY OF THE INVENTION

According to the invention there is provided a variable capacitance transducer comprising a metallic tube, a cable loop comprising a metallic cable portion, and a cable portion of insulating material, the cable portions being joined to form a loop which passes in one direction coaxially through the metallic tube and returns external to the tube, to thereby interlink with the tube, insulative first spacing means disposed inside the tube and arranged to maintain the cable loop passing therethrough coaxial with the tube, second spacing means disposed at each end of the tube to prevent electrical contact between the cable loop and the tube along the passage of the loop external to the tube, and contact means for making respective external electric connections to the metallic tube and the metallic cable portion, the first and second spacing means allowing the cable loop to be displaced along its length to thereby vary the capacitance between the metallic tube and the metallic cable portion.

According to the invention there is also provided a variable capacitor, comprising means providing a first elongate electrode, a cable loop made up of electrically conductive and electrically insulating portions and constrained to move in two substantially parallel runs, means mounting the elongate electrode between but electrically insulated from the two runs of the loop facilitating a greater capacitive coupling capability between the elongate electrode and one of the runs than between the elongate electrode and the other one of the runs, and respective electrical contact means for respectively contacting the elongate electrode and the electrically conductive portion of the cable loop whereby to pick off a capacitance which varies with the said movement of the cable.

DESCRIPTION OF THE DRAWINGS

A variable capacitance transducer embodying the invention will now be particularly described by way of example only, with reference to the accompanying diagrammatic drawings in which.

DESCRIPTION OF THE PREFERRED EMBODIMENT

Figure 1:
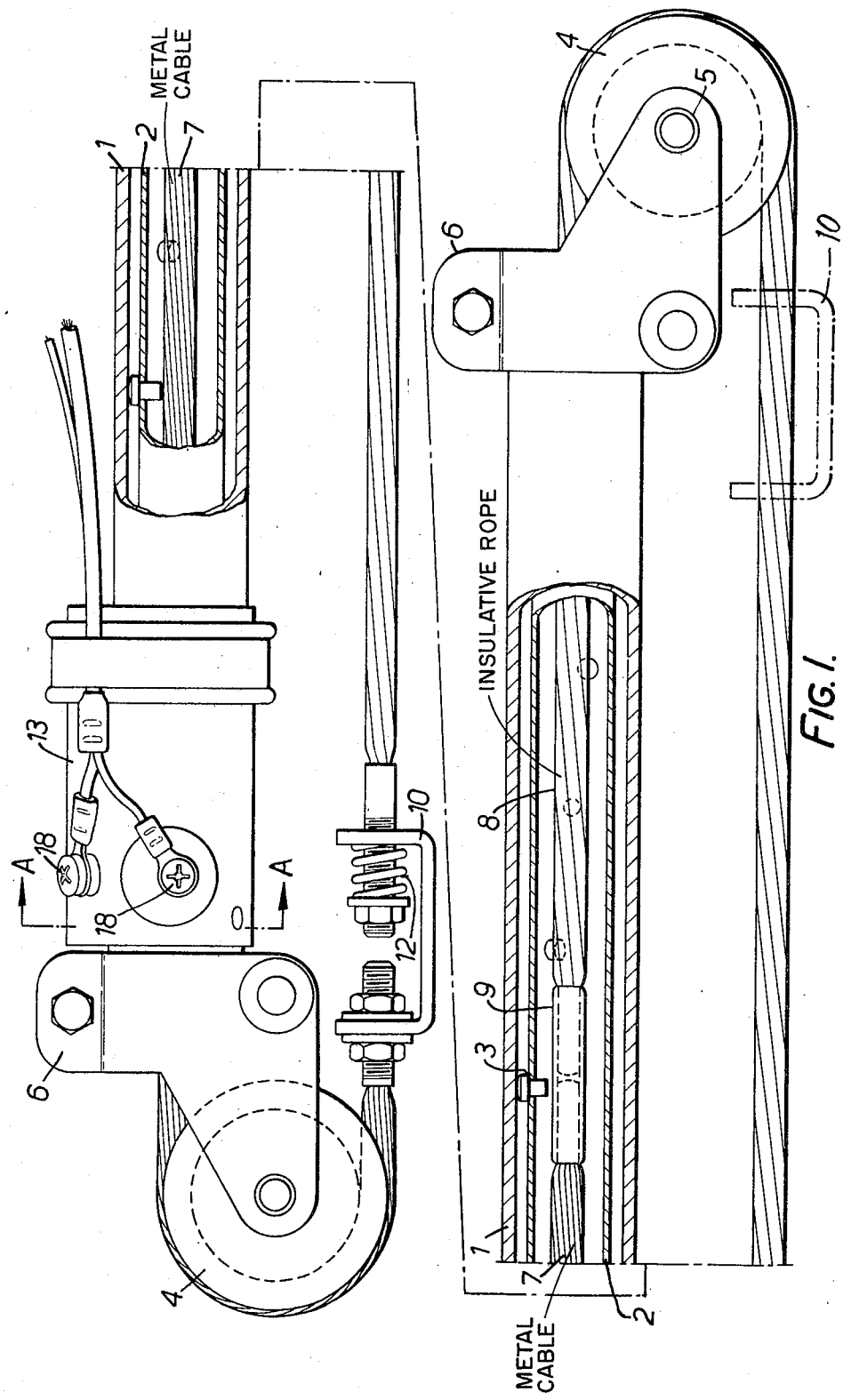
FIG. 1 is a part-sectional longitudinal view of the transducer.

As shown in FIG. 1, the variable capacitance transducer comprises a metallic tubular housing 1 of a length corresponding to the magnitude of linear displacement which the transducer is arranged to sense.

Figure 2:
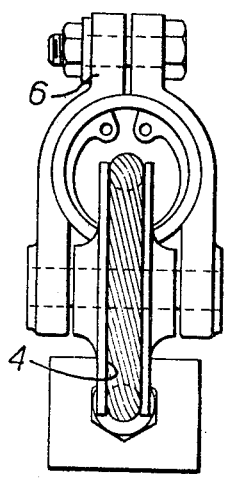
FIG. 2 is an end view of the transducer.

A metallic tube 2 is coaxially arranged inside the housing 1 and extends substantially over the length of the housing. The tube 2 is spaced from the housing 1 by insulating spacers 3 equally spaced from each other and arranged in a helical manner along the length of the housing and tube. Two pulleys 4 are disposed one at either end of the housing 1 and are rotatably mounted via pins 5 on end fittings 6 of the housing 1. The pulleys 4 (FIG. 2) are so offset from the center-line of the housing such that a cable formed as a loop and which passes around both pulleys, passes axially through the metallic tube 2 in one direction and returns in the opposite direction externally to, but parallel with the metallic tube 2 and housing 1.

Figure 5:
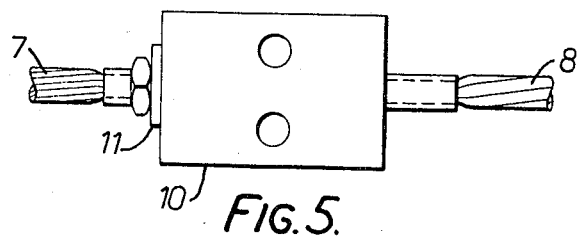
FIG. 5 is a view of a channel-shaped fitting of the transducer.

One half of the length of the cable loop is formed by a stranded or braided metallic cable 7, whereas the other half is formed by a twisted or braided rope 8 of an electrically insulative material. The junction of the two cable-halves 8 inside the metallic tube 2 is effected by a swage fitting 9 whereas the external junction is effected using a channel-shaped fitting 10 (FIGS. 1 and 5). The metallic cable-half is insulated from the fitting 10 by an insulating washer 11. The cable loop is pretensioned by a helical spring 12 which reacts between one end of one cable-half and the channel-shaped fitting 10. The insulating spacers 3 project into the internal space of the metallic tube 2 to assist in the central positioning of the cable loop.

Figure 3:
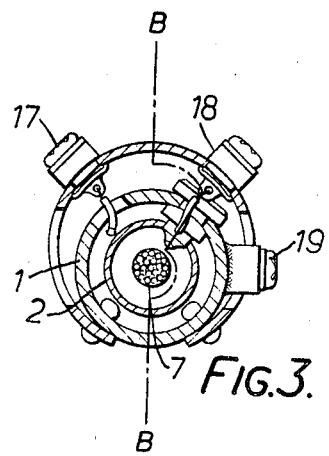
FIG. 3 is a cross section taken on line A—A of FIG. 1.
Figure 4:
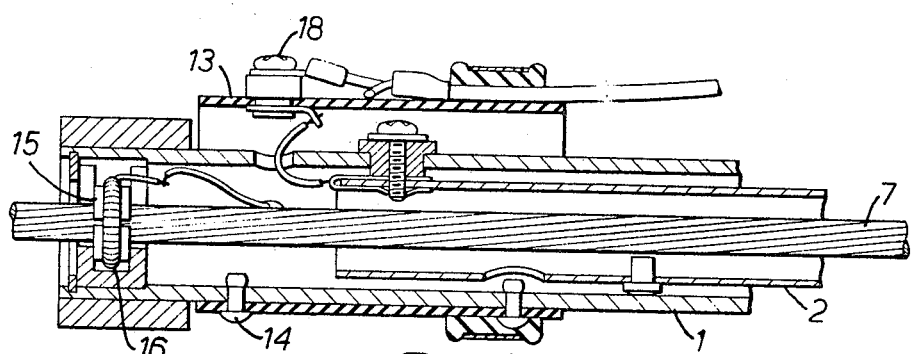
FIG. 4 is a section taken on line B—B of FIG. 3.

The metallic tube 2 and the metallic half 7 of the cable loop form two cooperating capacitor electrodes. The metallic cable-half 7 forms a low impedance element whereas the metallic tube 2 forms a high impedance element. A terminal tube 13 (FIG. 4) formed from an insulating material is riveted by rivets 14 to one end of the housing 1 and terminals for external connection of the transducer electrodes are mounted thereon. A metallic split collet bushing 15 is used to make a sliding electrical contact with the metallic cable-half 7 with which it is urged into contact by a garter spring 16. This collet bushing 15 is electrically connected to a terminal 17 (FIG. 3) mounted on the tube 13. The metallic tube 2 is electrically connected to a terminal 18 mounted on the tube 13. Advantageously, a shielded cable is used for making external connection from the terminal 17 of the high impedance element formed by the metallic tube 2 and therefore provision is made in the form of a terminal 19 (FIG. 3) to ground the shield to the housing 1.

The variable capacitance transducer operates as follows. As the external portion of the cable is displaced by a linear movement (applied for example to the fitting 10), more or less of the metallic cable-half 7 is withdrawn or entered within the metallic tube 2 thus forming a variable capacitor whose capacitance is directly proportional to the displacement of the cable loop.

Advantageously, the described transducer can be used in the measurement of relatively large linear displacements in the order of 7 to 500 inches.

The excess length of the transducer greater than the maximum magnitude of linear movement measurable is thus fixed and for large movements is only a small fraction of the movement measurable. A compact transducer is thus provided capable of measuring large displacements with infinite resolution.

That which is claimed is:

1. A variable capacitance transducer comprising:
   a metallic tube,
   a cable loop comprising:
   a metallic cable portion, and
   a cable portion of insulating material, the cable portions being joined to form a loop which passes in one direction coaxially through the metallic tube and returns external to the tube, to thereby interlink with the tube,
   insulative first spacing means disposed inside the tube and arranged to maintain the cable loop passing therethrough coaxial with the tube,
   second spacing means disposed at each end of the tube to prevent electrical contact between the cable loop and the tube along the passage of the loop external to the tube, and
   contact means for making respective external electric connections to the metallic tube and the metallic cable portion, the first and second spacing means allowing the cable loop to be displaced along its length to thereby vary the capacitance between the metallic tube and the metallic cable portion.

2. A transducer according to claim 1, comprising a metallic tubular housing coaxial with and enclosing the said metallic tube and being insulatively spaced therefrom.

3. A transducer according to claim 2, in which the first spacing means comprises a helical series of equally spaced insulating spacers arranged along the length of the metallic tube, the spaces additionally projecting externally to the tube to insulatively space the housing therefrom.

4. A transducer according to claim 1, in which the second spacing means comprises two pulleys disposed one at each end of the said tube to guide the cable loop axially through the tube, out of the tube, and externally parallel along and spaced from the tube.

5. A transducer according to claim 1 in which the cable loop is pretensioned.

6. A variable capacitor, comprising:
   means providing a first elongate electrode,
   a cable loop made up of serially coupled sections of electrically conductive and electrically insulating portions and constrained to move in two substantially parallel runs,
   means mounting the elongate electrode between but electrically insulated from the two runs of the loop and facilitating a greater capacitive coupling capability between the elongate electrode and one of the runs than between the elongate electrode and the other one of the runs, and a space between said cable loop and said elongate electrode when in capacitive relation,
   respective electrical contact means for respectively contacting the elongate electrode and the electrically conductive portion of the cable loop whereby to pick off a capacitance which varies with the said movement of the cable,
   a member joining the two portions of the cable together and electrically insulated from the conductive portion, and means for applying linear movement to the said member to move the cable,
   insulating means interposed in the space between said elongate electrode and said cable loop to prevent electrical contact between said electrode and said loop.

7. A capacitor according to claim 6, in which the elongate electrode is an electrically conductive tube enclosing one run of the cable loop.

8. A capacitor according to claim 7, including two rotatable pulleys respectively mounted at opposite ends of the said tube and around which the said cable loop runs.

9. A capacitor according to claim 8, including a grounded shielding tube enclosing the said conductive tube and the cable run therein and mounted with its wall extending between the two runs of the cable.

10. A variable capacitor, comprising:
    means providing a first elongate electrode,
    a cable loop made up of electrically conductive and electrically insulating portions and constrained to move in two substantially parallel runs,
    means mounting the elongate electrode between but electrically insulated from the two runs of the loop and facilitating a greater capacitive coupling capability between the elongate electrode and one of the runs than between the elongate electrode and the other one of the runs, and a space between said cable loop and said elongate electrode when in capacitive relation,
    respective electrical contact means for respectively contacting the elongate electrode and the electrically conductive portion of the cable loop whereby to pick off a capacitance which varies with the said movement of the cable,
    a member joining the two portions of the cable together and electrically insulated from the conductive portion,
    means for applying movement to the said member to move the cable, and
    insulating means interposed in the space between said elongate electrode and said cable loop to prevent electrical contact between said electrode and said loop.

* * * * *